INVENTOR.
ROBERT V. KROMREY
BY
ATTORNEY.

Sept. 26, 1972 — R. V. KROMREY — 3,694,284
METHOD OF MAKING HONEYCOMB STRUCTURES
Filed Nov. 10, 1969 — 2 Sheets-Sheet 2
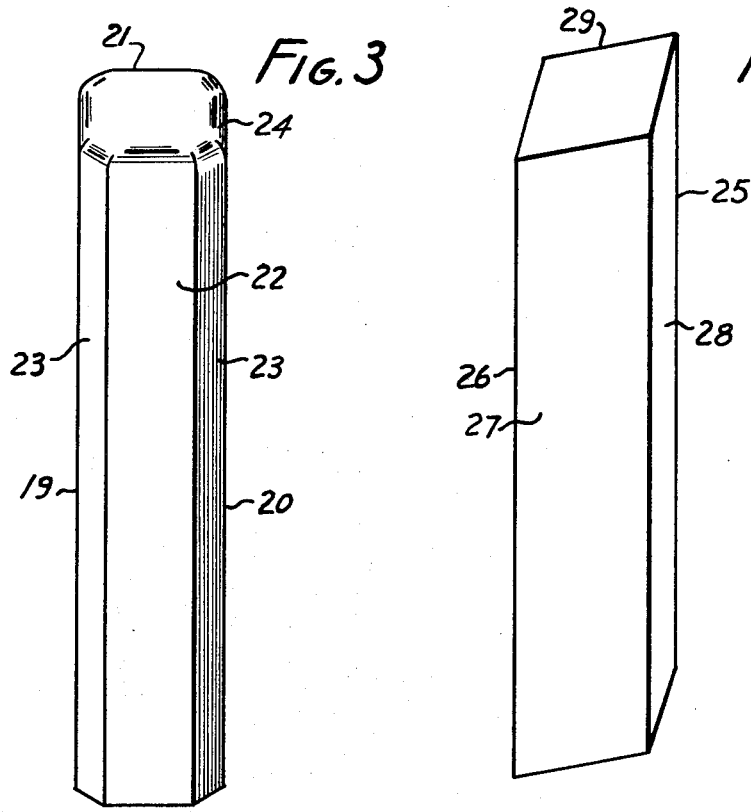
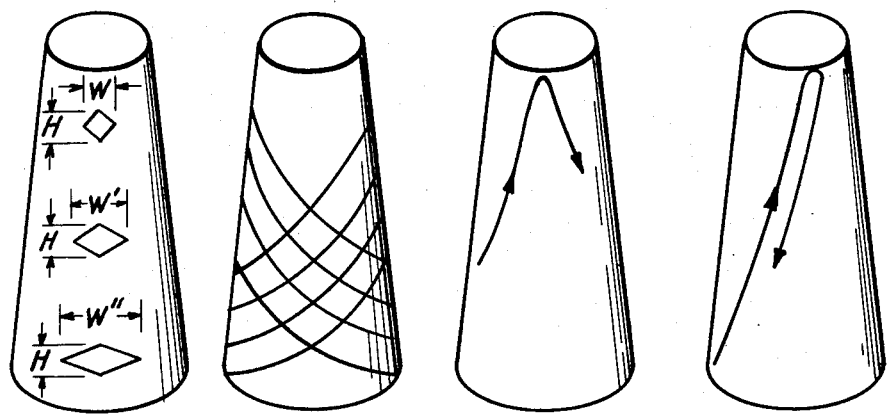
FIG.5  FIG.6  FIG.7  FIG.8
INVENTOR.
ROBERT V. KROMREY
BY D. Gordon Angus
ATTORNEY.

United States Patent Office

3,694,284
Patented Sept. 26, 1972

3,694,284
METHOD OF MAKING HONEYCOMB STRUCTURES
Robert V. Kromrey, Fair Oaks, Calif., assignor to Aerojet-General Corporation, El Monte, Calif.
Continuation-in-part of application Ser. No. 648,447, June 23, 1967. This application Nov. 10, 1969, Ser. No. 875,433
Int. Cl. B31c 13/00
U.S. Cl. 156—172                8 Claims

ABSTRACT OF THE DISCLOSURE

A honeycomb structure in accordance with the present disclosure comprises a matrix having a plurality of filament rovings arranged in overlapping relationship to form cellular walls. The overlapping rovings are bonded together by a bonding means. A plurality of dies are formed in a configuration to form a grid of slots corresponding to the walls of the honeycomb structure. The filament rovings are wound into the slots in overlapping relationship to assume the desired configuration. Preferably, the rovings are wrapped so that at the intersection of crossing and overlapping filament rovings, the rovings are flattened into chamfered areas of the cells so as to increase the area of the bond between overlapping and intersecting rovings, thereby increasing the strength of the honeycomb wall structure in a Z or radial direction.

---

This application is a continuation-in-part of copending application Ser. No. 648,447, for "Honeycomb Structures" filed June 23, 1967 and assigned to the same assignee as the present application.

This invention relates to honeycomb structures, and particularly to filled cell honeycomb structures exhibiting high strength in three dimensions.

In the aforementioned copending application, there is described a honeycomb structure comprising a combination of an ablative shell and a supporting honeycomb structure. The fibers of the honeycomb cell are intertwined with the fibers of the ablative shell so that the structure retains its strength after being heated to temperatures at which the resin would normally decompose. In one embodiment described in the aforementioned application, there is described a honeycomb structure in which the cells are filled with precured resin-reinforced dies having a sinusoidal shape. The cell walls are formed of strips of fabric, and the die press the fabric together to form the honeycomb structure. However, it has been found that the junction of the fabric forming the honeycomb structure sometimes failed and separated thereby causing a weakening in the structure in a plane normal to the junction. These junctions are supported only by the bonding strength of the resin joining the fabric, and are sometimes hereinafter called "node bonds."

It is an object of the present invention to provide a honeycomb structure which provides a high strength in three dimensions, even at intense temperatures.

Another object of the present invention is to provide a filament wound honeycomb structure capable of supporting loads in three dimensions.

Another object of the present invention is to provide a supporting honeycomb structure in which the honeycomb structure comprises filament wound material.

In accordance with the present invention, a honeycomb structure comprises a filament wound structure woven in a grid so that the filaments will support loads in the plane of the grid. Filament material may be molded to form a cell filler to increase strength in the third dimension.

According to one feature of the present invention, the bonds, or cross-over points between the woven filament rovings are flattened thereby providing an enlarged bonding surface thereby increasing the bond strength in the direction normal to the plane of the rovings.

Another object of the present invention is to provide a honeycomb structure having woven intersecting cell walls, thereby eliminating the objective node bonds.

Figure 1:
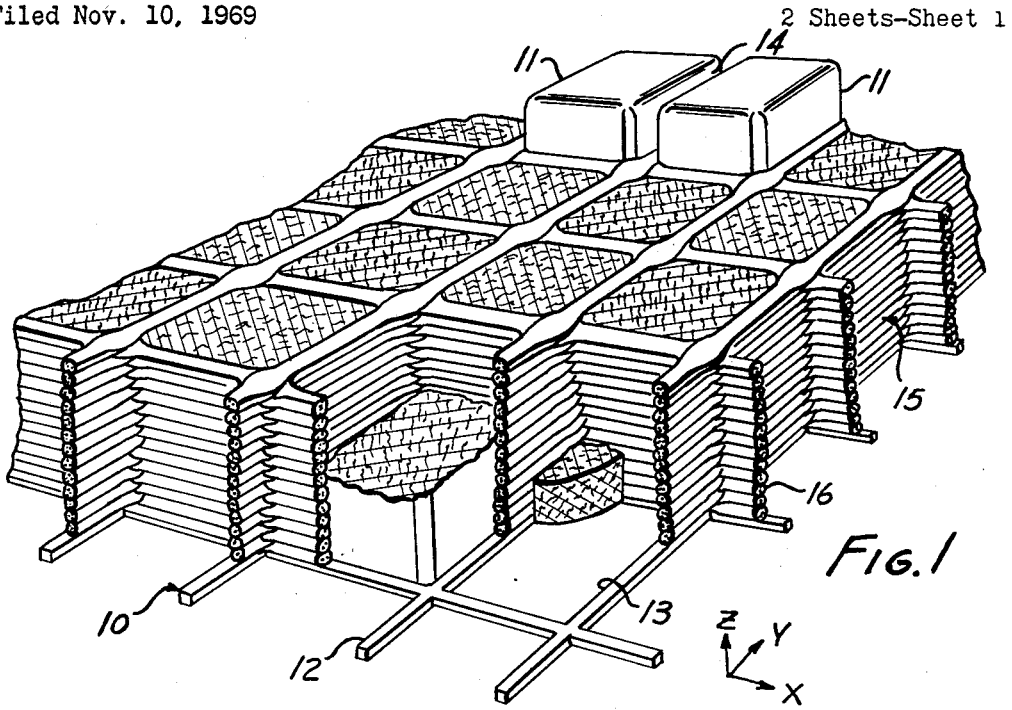
Figure 2B:
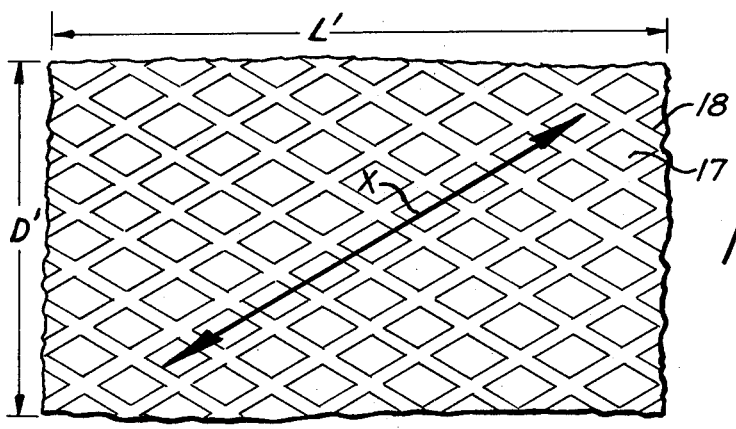
Figure 2A:
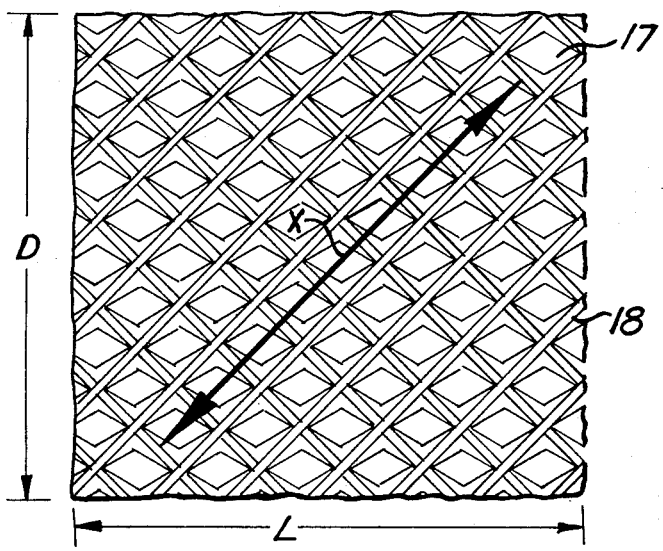

The above and other features of this invention will be more fully understood from the following detailed description and the accompanying drawings, in which:

FIG. 1 is a perspective view of a portion of a honeycomb structure in accordance with the presently preferred embodiment of the present invention;

FIGS. 2A and 2B, taken together, illustrate a method of debulking the honeycomb structure illustrated in FIG. 1;

FIGS. 3 and 4 illustrate various dies for use in constructing the honeycomb structure in accordance with the present invention; and FIGS. 5, 6, 7 and 8 illustrate different methods of wrapping filament rovings to form honeycomb structures in accordance with the present invention.

In FIG. 1 there is illustrated a mold or die 10 having a plurality of pillars or filler cells 11 attached to a plate 12. Pillars 11 form an array of continuous slots 14 between them.

Pillars 11, which are sometimes hereinafter referred to as cell filler material, are constructed of suitable honeycomb cellular material, such as quartz, carbon and graphite yarns, alone or in combination, impregnated with a phenolic or other ablative resin. The fibers of quartz carbon and/or graphite are oriented in a colinear plane by a collimation process involving drawing the yarn fibers from supply spools through a furnace where the yarn is then impregnated with phenolic resin and heated to an elongated cellular shape. The strands of yarn are thereafter cooled, and the strands are collected on drums and retained in cold storage. When it is desired to use the strands, the strands are heated in a pressure mold to the desired shape, such as square, rectangular or diamond shaped. The molded strands are then cut to a desired length.

Plate 12 is formed from stainless steel sheet stock containing precision photo-etched holes 13. The molded cell fillers or impregnated strands 11 are positioned into the holes 13 in plate 12 so as to stand or protrude from the surface of the plate. With the cell fillers 11 in place in apertures 13 of plate 12, an array of continuous channels or spaces 14 between pillars 11 is formed. As will be more fully understood hereinafter, the width of spaces 14 is preferably of the order of the diameter of the cell wall material.

The cell walls 15 comprise a plurality of rovings 16 woven through the spaces 14 between adjacent pillars of cell filler material 11. By way of example, roving 16 may comprise suitable quartz or graphite rovings of the order of about 0.010 to 0.015 inch in diameter, and the space 14 between pillars 11 may be between 0.015 and 0.025 inch. The rovings may be preimpregnated with phenolic resin prior to being woven into spaces 14, or they may be wetted with resin during the winding process. During the winding process, rovings 16 are wound in moderate tension via a payoff head (not shown) through spaces 14 to overlay previous wound rovings.

In FIG. 2A there is illustrated a plurality of diamond shaped molds or cells 17 between which rovings are wrapped to form cell walls 18. The honeycomb structure illustrated in FIG. 2A is debulked by loading the structure in tension along the direction of dimension L and in compression along the direction of dimension D thereby increasing dimension L to dimension L' illustrated in FIG. 2B and decreasing dimension D in FIG. 2A to dimension D'. In the case of a cylindrical or conical honeycomb wall where D and D' are diameters, the diameter D decreases to dimension D' while the length of the cylinder or cone increases to length L'.

The separation between opposite walls of the cell remains constant during a debulk process as illustrated by dimension X. Thus, the cell size remains constant while the orientation of the cell walls may be moved to different diagonal positions. In the case of a cylindrical or conical body, the body is loaded along the diameter to reduce the diameter and increase the length of the body. In the case of the flat panel, the body is laterally loaded causing inward movement in one plane and expansion in an opposite plane. The lateral movement of the flat body is proportional to the decrease in circumference of the cylinder or cone, and the length increase of a flat panel is equal to the axial growth of a cylinder or cone.

Prior to, during, or after the debulk process to form the finished shape of the structure, the cell wall is preferably additionally impregnated with phenolic or other suitable resin by immersing the entire structure into a prepared resin solution. The assembly is then vacuum and pressure cycled to assure resin impregnation throughout the yarn. Following impregnation with resin, the resin is staged and cured or molded under pressure to form the completed part. The molding pressure may be applied by the lateral compression on the part imposed during the debulk process.

FIGS. 3 and 4 illustrate different cellular fillers for use in constructing honeycomb cells in accordance with the present invention. In FIG. 3, there is illustrated an orthogonal cell having opposite cell walls 19 and 20 and 21 and 22. Between cell walls 19, 22, 20 and 21, the corners are chamfers 23. Preferably, the distance between opposite walls 19 and 20 and 21 and 22 is approximately 0.058 inch, and the surface width of each chamfer 23 is approximately 0.020 inch. The length of each cell is preferably of the order of about 0.68 inch. Preferably, the cells include tapered portion 24 at the outermost portion of the cells to guide rovings into slots 14 between the cells.

The type of cell illustrated in FIG. 3 is utilized for filler cells 11 in FIG. 1 wherein the chamfers enable the rovings 16 to be flattened in the region of the junction of the rovings to thereby increase the surface area of the resin bond between successive layers of rovings 16. The increased area of the bond increases the strength of the honeycomb structure in the Z direction (along the length of filler cells 11), over that which might result from a lesser surface area between joined rovings. Also the volume of filament material present at intersections is greater than elsewhere due to the cross-over of rovings forming each intersection wall. The additional volume of filament material at the intersections precludes crushing the material under the presure of molding and debulking processes.

FIG. 4 illustrates a different filler cell 25 which is of a substantially diamond shape having opposite walls 26, 27, 28 and 29. The matching edges of walls 26 through 29 may or may not be chamfered as illustrated in FIG. 3. The cell illustrated in FIG. 4 is particularly useful for winding the cell walls in an orthogonal pattern and then debulking the walls to a diamond configuration as described in connection with FIGS. 2A and 2B.

FIGS. 5 through 8 illustrate various methods of winding filament rovings onto a conically or frustoconically shaped object. FIG. 5 illustrates a spiral-helical line of wrapping filament rovings which is determined by the angle formed by dies or cell fillers. The angle will change with each die or cell along the axis of the cone and the diamond shape of each die or cell becomes narrower towards the apex of the cone. In the type of arrangement illustrated in FIG. 5, the width W to W" of each diamond is proportional to the circumference of the cone at the location so that there are a constant number of cells about the periphery of the cone at any location along the length of the cone. Also, it is preferred that the height H of each cell be equal to all other cells. In winding on the cone, it is obvious that the groove will follow constantly changing angle in a path along the cone surface as determined by the changing diamonds.

FIG. 6 illustrates another cone wherein the filament windings are equally spaced in a helical pattern. FIG. 7 illustrates one method of wrapping a helical winding wherein the filament rovings may be directed up one side of the helix and down an opposite side in an oppositely wrapped direction. To solve the problem of the turn-around of the payoff head at each end of the cone, a switch mechanism (not shown) may be utilized so that the filament rovings would travel up one side and back down in an adjacent groove as illustrated in FIG. 8.

The present invention thus provides a filament wound honeycomb structure capable of withstanding relatively high temperatures, and usually above the destruction temperature of the resin. In this sense, the honeycomb is an ablative structure highly suitable for high temperature applications.

Wall structures constructed in accordance with the present invention display a high degree of strength. For example, a honeycomb structure constructed of carbon fibers wrapped on graphite filler cells and having dimensions as hereinbefore set forth have exhibited tensile strength of the order of between about 10,000 p.s.i. and 15,000 p.s.i. in the X and Y direction (hoop and meridional planes) and as much as 50,000 p.s.i. in the Z direction (radial plane). (See FIG. 1.) The high tensile strength results from the three dimensional characteristics of the material and permits balancing of the strength in the X, Y, and Z directions into any desired combination.

Resistance to impulse loading is derived from the use of dissimilar materials in the cells, for example, high modulus graphite and carbon fibers. Resistance to impulse loading is also affected by the geometric orientation of the part, and the high radial strength. Resistance to erosion at high temperatures, and particularly temperatures above the char-temperatures of the resin is a function of the cell filler area to cell wall area ratio at the exposed surface. Greater erosion existence is realized by increasing the area ratios. Cells in accordance with the present invention are 50% to more than 70% cell material for an area ratio of between 1:1 to 3:1. Also, where an increased number of edge-orientated fibers of the cell filler material is exposed, particularly at the surface of the honeycomb structure, erosion resistance is greater. An increased number of edge orientated fibers in the filler material also has a tendency to lower the thermal gradient in the Z direction, thereby reducing the thermal shock sensitivity over that associated with fibers which are parallel to the surface.

By utilizing cellular walls of the order of about 0.06 inch upon a side, the filler area may comprise as much as 50% to 70% of the entire composite area, and by varying the relative dimensions of the wall material and of the filler the thermal and strength characteristics of the honeycomb structure may be varied as desired.

This invention is not to be limited by the embodiments shown in the drawings and described in the description, which are given by way of example and not of limitation.

What is claimed is:

1. The method of constructing honeycomb structures comprising the steps of arranging a plurality of dies into a configuration to form an array of intersecting slots corresponding to the walls of the desired honeycomb structure; wrapping filament rovings into said slots in overlapping relationship to assume the configuration of the walls of said honeycomb structure; impregnating said rovings with a binder; and hardening said binder.

2. The method according to claim 1 wherein said filament rovings are wrapped first in one direction and then in another direction so that intersecting rovings overlap each other.

3. The method according to claim 1 wherein said filament rovings are wrapped in a plurality of overlapping layers so that the wall thickness of the cells of said honeycomb structure is approximately equal to the thickness of said filament rovings.

4. The method according to claim 1 wherein said dies are constructed of a suitable filler material for the honeycomb structure and said method further includes bonding said dies to contiguous filament rovings.

5. The method according to claim 2 further including flattening said filament rovings in the plane of wrapping at the intersection of overlapping filament rovings to increase the bond area between overlapping filament rovings.

6. The method according to claim 1 further including debulking the wrapped filament rovings prior to curing the binder by increasing tension on the honeycomb structure in a direction nonparallel to the wrapped rovings to increase a dimension of the structure in the plane of the direction of tension and decreasing a dimension of the structure in a plane normal to the first-named plane.

7. The method according to claim 1 wherein said rovings are preimpregnated with curable resin prior to being wrapped.

8. The method according to claim 1 wherein the said rovings are impregnated with curable resin by immersing the structure in a resin solution, and then subjecting the structure to alternate increased and decreased pressure.

References Cited

UNITED STATES PATENTS

| 2,445,290 | 7/1948 | Gonda | 156—173 X |
| 2,763,316 | 10/1956 | Stahl | 156—149 |
| 2,902,395 | 10/1959 | Hirschy et al. | 156—172 X |
| 3,070,198 | 12/1962 | Haskell | 156—197 UX |
| 3,300,354 | 1/1967 | Duft | 156—169 |
| 3,195,207 | 7/1965 | Fougea | 25—118 |

BENJAMIN A. BORCHELT, Primary Examiner

G. E. MONTONE, Assistant Examiner

U.S. Cl. X.R.

156—197